J. Cochrane.
Screw Swaging.
No. 3998. Reissued May 31. 1870
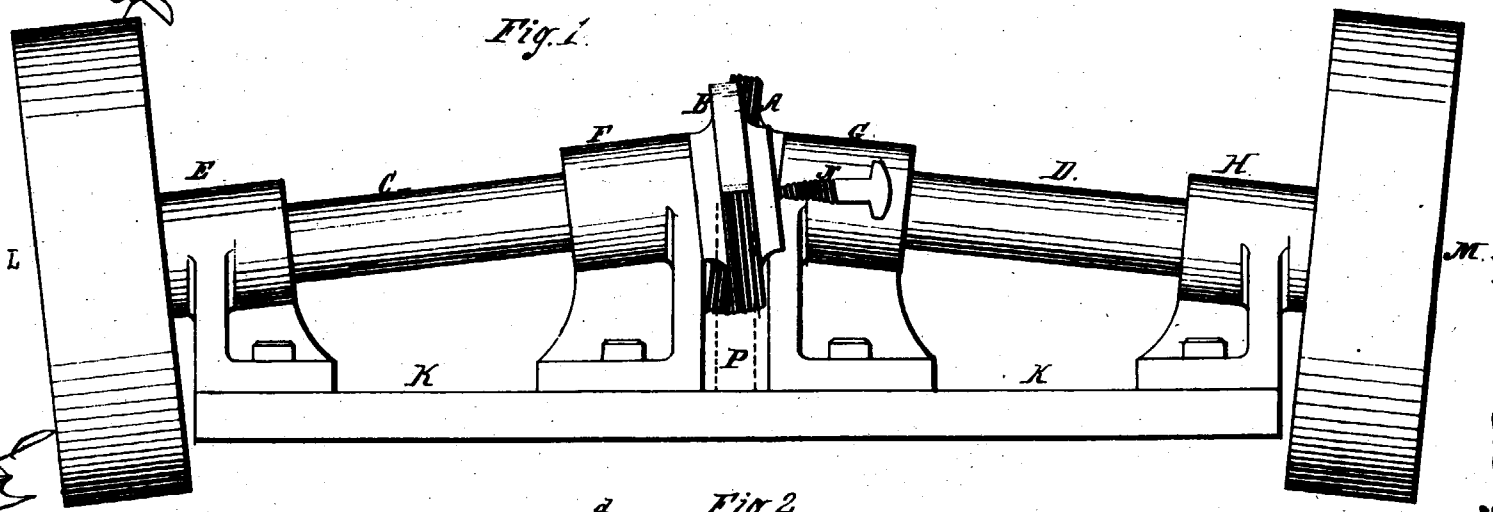
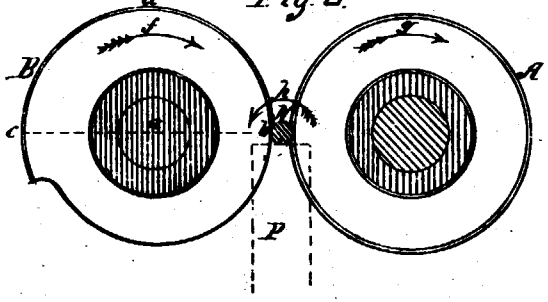
Witnesses.
A. M. Alexander
J. H. Hunter
Inventor.
John Cochrane

UNITED STATES PATENT OFFICE.

JOHN COCHRANE, OF WALL TOWNSHIP, MONMOUTH COUNTY, NEW JERSEY.

IMPROVED MACHINE FOR FORGING OR ROLLING SCREW-THREADS UPON METAL BOLTS.

Specification forming part of Letters Patent No. 63,364, dated April 2, 1867; antedated March 24, 1867; Reissue No. 3,998, dated May 31, 1870.

*To all whom it may concern:*

Be it known that I, JOHN COCHRANE, of the township of Wall, county of Monmouth, and State of New Jersey, have invented a new and useful Machine for Forging or Rolling Screw-Threads upon Metal Bolts; and I do hereby declare that the following is a full and exact description thereof, reference being had to the accompanying drawings, and to the figures and letters marked thereon, and in which—

Figure 1 is a side elevation of a machine embodying the principles of my invention, and Fig. 2 a front elevation of the operative parts thereof.

The nature of my invention consists in forming or making screw-threads upon metal bolts by means of cross-rolling, the rolls or revolving dies being furnished with projecting threads upon their peripheries corresponding in reverse to the shape and pitch of the required screw, and so inclined or placed relatively to each other that the said projecting threads shall rake with or conform to the angle of such required screw upon the opposite sides of the bolt.

To enable others skilled in the art to make and use my invention, I will proceed to describe the construction and operation of a machine designed for the special purpose of forming screw-threads upon the screw-spikes or wood-screw bolts which are used in fastening railroad-rails to the cross-ties, one of the objects of this invention being to cheapen the cost of such fastenings. It is not intended, however, to confine the use of the invention to the manufacture of such screws, as it is applicable to the threading of all kinds of screw-bolts, whether for taking into metal nuts or into timber.

The said screw-spikes or wood-screw bolts are usually made of five-eighth or three-quarter inch round bar-iron. The screwed part is made tapering or of equal diameter for a small portion only of its length, and then tapering down to a gimlet-point. The thread is usually made thin and of serrated form, so as to enter freely and hold efficiently in timber, and for the sizes stated is about a quarter of an inch in pitch and about an eighth of an inch in depth.

For the production of such a screw I use a pair of rolls or revolving dies, about twelve inches diameter, of wrought-iron, faced with steel, and properly tempered, one-half the periphery of such a roll or die being about equal to the length of the helix or thread of such screw as measured on the line of mean surface, and, preferring the use of cylindrical rolls for this purpose, I make upon the periphery of one of them, A, a series of projecting threads—say three or four—corresponding in reverse to the shape of the threads and spaces of the required screw. The other roll, B, I make about the same size, but one-half or so of its periphery I make eccentric and with about a half-inch of throw, the minor radius, *a b*, of this eccentric part being about a quarter of an inch less than the radius of the roll A, and the major radius, *a c*, about a quarter of an inch more than the radius of the roll A, so that the eccentric surface *a b c* shall conform to the taper of the bolt, and it is threaded like the roll A, but the remaining portion of the periphery is without threads. If, however, the screwed portion of the bolt is to be of cylindrical form, terminating in a conical or gimlet point, the threaded portion of the roll B must be shaped to suit these conditions; and if screws of cylindrical form only are required, the eccentricity of this roll is dispensed with and its threaded portion made cylindrical and of the same radius as the roll A, but in all cases the denuded portion of the roll B, or of the revolving die corresponding thereto, must be of such reduced or lower surface as will afford the necessary space in which to insert the blank bolt between the two while in motion; but if the machine is so operated as to stop on completing the screw to give the necessary interval of time for inserting the blank, the denuded portion need not be more than about one inch in length, which would afford a greater portion of the surface to be used as a die, thus enabling the machine to make longer screws with the same diameter of roll or die, or to have such diameter greatly reduced.

The rolls or revolving dies are attached to substantial spindles, as C and D, and should be securely mounted in proper bearings, as E, F, G, and H, cast upon or attached to a substantial bed-piece, as K K, so as to combine all the parts together, all of which parts should be heavy and well fitted to prevent yielding or springing while in operation.

The projecting threads upon the rolls or revolving dies instead of being helical may be constructed in the form of annular projections or members placed parallel or in the same direction with each other, and must be adjusted to the angle of the required screw upon the bolts by inclining or placing the rolls or revolving dies in the manner or position necessary for that purpose upon their respective sides of the blank or bolt, and which, when the threads are upon cylindrical surfaces, is accomplished by inclining the spindles in opposite directions, as shown at C and D in Fig. 1. This annular construction of the screw-forming threads is an important improvement not only to the operation of the machine, but also as effecting a very great saving in its original cost and subsequent repairs.

In setting the rolls or revolving dies great accuracy should be observed in their adjustment, so as to have the screw-forming threads coaptate exactly in position and angle with the threads and spaces of the screw to be made upon the blank or bolt.

Upon the outer ends of the carrying-spindles or elsewhere thereon I attach a pair of pulleys, L and M, about twenty-four inches (more or less) in diameter, and of sufficient face for belts of five or six inches in width, which driving belts also pass over a pair of similar pulleys upon a countershaft laid parallel to a vertical plane passing through the axis of either of the spindles C and D, and in the same horizontal level with the centers of the pulleys L and M, or in such wise as will drive both the rolls A and B or the revolving dies upon such spindles with the same speed and with such direction of motion, respectively, as will cause the blank or bolt to rotate between such rolls or revolving dies, and which for right-hand screws, in the construction shown in the drawings, must be as indicated by the arrows *f* and *g*, Fig. 2, and for the purpose of steadying the motion it would be advantageous to attach to each of the spindles a fly-wheel of suitable size and weight; but if they are driven by cog-wheel gearing, the fly-wheel should be attached to the pinion or driving-shaft, but in all cases when the rolls or revolving dies are driven by belts the screw-forming threads must be of the annular construction.

The blank or bolt upon which the screw is to be formed, being previously heated, as in the ordinary operations of forging or rolling iron, is placed between the two rolls or revolving dies to the full extent or distance upon which the screw is to be formed upon it, the head of the bolt being to the outside or front. There is also a support, as shown by dotted lines at P in both figures, upon which the heated bolt is deposited when placed in the machine, and upon which it rests till the threaded portion of the roll B or revolving die corresponding thereto comes in contact with it, when it will be pressed against the roll A or opposite revolving die. The threads on both rolls or revolving dies will then penetrate the blank or bolt on its opposite sides, and one of the rolls or revolving dies, acting across the surface of the bolt from below upward and the other in like manner acting across the surface from above downward, and the screw-forming threads penetrating the blank or bolt to their full depth, and, as it were, gearing into its surface on its opposite sides and with opposite directions of motion, it is thereby caused to revolve upon its own axis between them, as indicated by the arrow *h* in Fig. 2, and making the indentation caused by the penetration of the threads on the rolls or revolving dies continuous upon the bolt by their angular action, thus forming an elevated helix or screw-thread upon it between the said indentations, and the bolt being in this manner rotated upon its own axis from right to left, it will be worked outward to the front by the action of the screw-forming threads upon it as the operation of making the screw progresses, in which screw-forming threads the bolt is moved longitudinally, as in the threads of a nut, till the screw is completed or finished from the neck to the point, when it is thrown out in front from between the rolls or revolving dies, as shown at N in Fig. 1.

In thus forming a screw upon a blank or bolt the metal which has been forced from between the threads is worked into the substance of the bolt, thereby adding to its length and thus utilizing all the material, and the operation has the further effect of consolidating the metal in the central part of the bolt, which makes the bolts that are threaded by this process much stronger than those screwed in the usual manner by cutting-dies or chasing, for, as is well known, the central portion of round bar-iron is of inferior strength when compared with the exterior portion of such iron, yet in making screws by cutting away the metal from between the threads it is the best and strongest portion of the iron that is removed from the bolt and wasted, and the threads which are formed by cutting-dies or chasing, being across the fiber of the iron, are of less strength than those which are formed by cross-rolling, because by this mode of production the fiber of the iron is retained.

The speed of the rolls or revolving dies should be so regulated as to suit the dexterity of the attendant in placing the blank bolts between them at the proper moment, so that a blank bolt may be placed between the rolls or revolving dies, have a screw formed upon it, and be delivered from the machine at each revolution. A machine thus constructed and operated could turn out from thirty to sixty of these screw-spikes per minute, as the blanks may be deposited, when taken from the heating-furnace, in proper order near the support P, so as to be easily set or pushed into the space between the rolls or revolving dies at the proper moment. It would therefore be possible for such a machine to make and deliver from twelve thousand to twenty-five thousand or more of such screws per day.

I have said that the rolls or revolving dies, instead of being driven by belts, may be driven by cog-wheel gearing, so as to unite and combine their movements. When thus driven, both rolls or revolving dies may be made with a threaded and a plain part, as shown in the roll B, for the cog-wheel gearing will insure the return to each other of such threaded and denuded parts in each revolution, while the possibility of the belts slipping on the pulleys requires that one of the rolls or revolving dies, when operated by belts, should be completely threaded, so as to be always in position to oppose the threaded portion of the other roll or revolving die; but instead of making either or both the rolls with threaded and denuded parts in their peripheries, as described, both of them may be cylindrical and have complete threads upon their peripheries, like the roll A, by causing either or both of said rolls to move laterally to and from the other at proper intervals by means of cams or other suitable mechanism, as well known and understood by the constructors of such machinery, so as to open the rolls wide enough apart to receive the blank between them without being acted on by them, and then to close them upon it so as to form a screw thereon by the penetration into such blank of the members or threads that are on the peripheries of the rolls.

In this mode of construction the diameter of the rolls is not controlled by the length of the helix to be formed upon the bolt. They may therefore be of any convenient diameter, and by giving such form to the cam or such movement to the laterally-operating mechanism as may be required screws of uniform diameter or tapering or gimlet-pointed may be produced, and various other modifications or arrangements of the mechanism might possibly be suggested or made without thereby changing the nature of the invention. I do not therefore limit myself to any specific arrangement or proportion of the parts or mode of operating the same, but claim the right to construct and operate the machine in the manner best calculated to answer the purpose for which it is intended so long as the principles by which the invention is characterized are employed.

The bolts passing through this machine being highly heated, it will be necessary to cool all the parts with which they come in contact, so as to preserve the machine from the injurious effects of such heat, which cooling may be done by the application of water thereto, as is usual in such cases.

Having thus described the nature, construction, and mode of operating mechanism for making screw-threads on metal bolts by means of cross-rolling, and described some of the variations in construction and operation of which such cross-rolling mechanism is susceptible, what I claim therein as my own invention, and desire to secure by Letters Patent of the United States, is—

1. The combination, with each other, of two rolls or revolving dies having on their peripheries projecting threads of proper form and arrangement to produce or make the required screw upon the heated blank, and having a denuded portion of lower surface in either or both of said rolls or revolving dies so as to permit the introduction of the blank bolts between them at the proper moment for that purpose in each revolution, substantially as herein described.

2. The combination, with each other, of two rolls or revolving dies having screw-forming threads on their peripheries, so arranged, constructed, and operated as to produce or make screws upon metal blanks or bolts of uniform diameter or tapering or gimlet-pointed, substantially as described.

3. The combination, with each other, of two rolls or revolving dies having annular threads or portions thereof for making screws upon metal blanks or bolts, and so inclined or placed, respectively, as to conform to the angle of such screw upon its opposite sides, and so operated as to make screws upon metal blanks or bolts of uniform diameter or tapering or gimlet-pointed, substantially as described.

4. The bolt-threading device consisting of two rolls or revolving dies with annular threads arranged in relation to each other so that said annular threads shall conform to the rake of the required screw, substantially as described.

JOHN COCHRANE.

Witnesses:
A. B. MALCOMSON, Jr.,
J. H. HUNTER.